May 13, 1930.

C. BARBIERI

CONICAL CUP DISPENSER

Re. 17,664

Original Filed May 6, 1926

INVENTOR

Cesare Barbieri

BY Charles G. Wells

ATTY

Reissued May 13, 1930

Re. 17,664

UNITED STATES PATENT OFFICE

CESARE BARBIERI, OF NEW YORK, N. Y., ASSIGNOR TO VORTEX CUP COMPANY, A CORPORATION OF ILLINOIS

CONICAL-CUP DISPENSER

Original No. 1,694,157, dated December 4, 1928, Serial No. 107,011, filed May 6, 1926. Application for reissue filed August 31, 1929. Serial No. 389,834.

This invention relates to a cup dispenser, and more particularly to a dispenser adapted to permit conical cups of different sizes to be dispensed one at a time from a magazine through a base member adapted to be equipped with cup retaining rings of different sizes positioned in parallel planes so that in case more than one cup is withdrawn through one of the retaining rings the second retaining ring will act as a means for holding back additional cups as the outermost cup is being withdrawn through the second retaining ring.

It is an object of this invention to provide a dispenser for conical cups of simplified construction adapted to removably receive discharge ring members of different sizes to permit conical cups of different dimensions to be dispensed through the device.

It is also an object of this invention to provide a dispenser for conical cups having a plurality of ring members therein through which the cups are pulled in consecutive order to insure discharge of only one cup at a time from the machine.

It is an important object of this invention to provide a dispenser for conical cups, said dispenser having notched ring members therein through which the cups to be discharged are drawn to insure dispensing of cups one at a time from the lowermost ring in the device.

Other and further important objects of this invention will be apparent from the disclosures in the specification and the accompanying drawings.

This invention (in a preferred form) is illustrated in the drawings and hereinafter more fully described.

Figure 2:
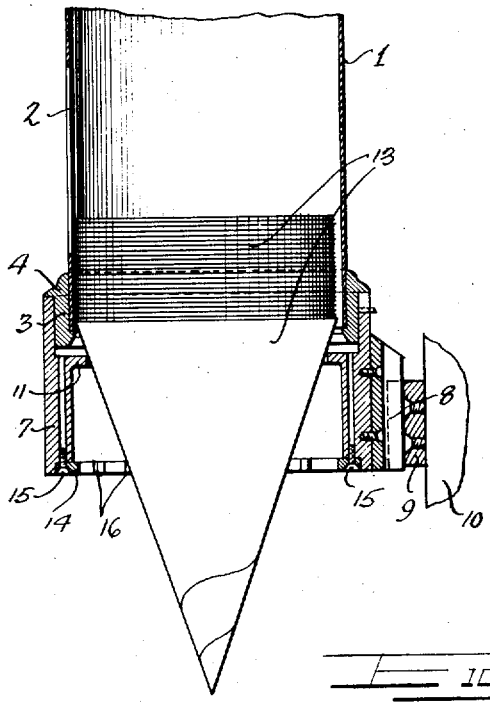
Figure 2 is a fragmentary longitudinal section taken on line II—II of Figure 1 showing a stack of cups in elevation.
Figure 3:
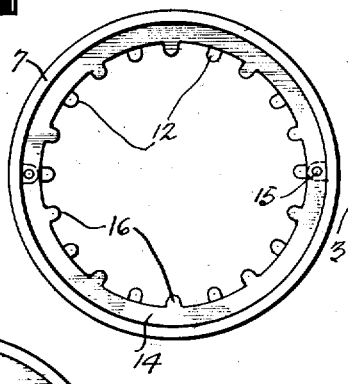
Figure 3 is a bottom plan view of the device.

The reference numeral 1 indicates a cylindrical container or housing made of metal or other suitable material, and having a longitudinally disposed sight aperture or slot 2 in the front wall thereof. If preferred the housing 1 may be constructed of glass, in which case the sight aperture may be omitted. The container or housing 1 is closed at its upper end. The lower open end is securely engaged in a metal base ring 3 provided with a stop flange 4. Rigidly secured on the outer peripheral surface of the base ring 3 is a locking pin or projection 5, which is adapted to be engaged in a bayonet slot 6, provided in a supporting ring or bracket 7, made of metal or any other suitable material. The supporting ring or base 7 has secured on the exterior thereof a longitudinally disposed dove-tailed web or tapered supporting flange 8 shaped to fit in a dove-tailed groove of a wall socket or bracket 9, which is adapted to be secured to a wall 10 or other suitable support as illustrated in Figure 2. Integrally formed within the base ring 7 a short distance from the upper end thereof is a cup retaining ring 11, the inner peripheral margin of which is cut away to provide a plurality of notches leaving a plurality of rounded fingers or projections 12 the ends of which are rounded and are adapted to come in contact with the outer wall of the upper end of the lowermost cup of a stack of conical cups 13 positioned within the container 1 and projecting outwardly through the supporting ring 7. The retaining ring 11 with its fingers 12 thus serves as a means for supporting the stack or column of cups at different points circumferentially of the lowermost cup so that when the end of a cup is drawn from the container its conical wall may flex into the spaces between adjacent fingers 12 so as to ease the withdrawal movement of the end cup. For the purpose of preventing more than one cup from being withdrawn from the dispenser a second cup retaining ring 14 is provided to removably seat in a recess formed in the lower end of the inner peripheral wall of the base ring 7. The lower retaining ring 14 is removably held in place by means of retaining screws 15 or other suitable means. The inner peripheral margin of the lower or secondary cup retaining ring 14 is notched to afford a plurality of circumferentially positioned rounded projections or fingers 16, as clearly illustrated in Figure 3. The fingers 16 of the lower ring member 14 are staggered with respect to the fingers 12 of the inner or upper cup retaining ring 11.

In case two cups are withdrawn from the container 1 through the primary or inner retaining ring 11 said cups are adapted to pass between the space between the rings 11 and 14 so that the second cup will come in contact with the lower retaining ring 14 and will be held in place thereby as the lowermost cup is being withdrawn through the second retaining ring. It will thus be seen that the dispenser is adapted to insure dispensing of the cups one at a time.

Figure 1:
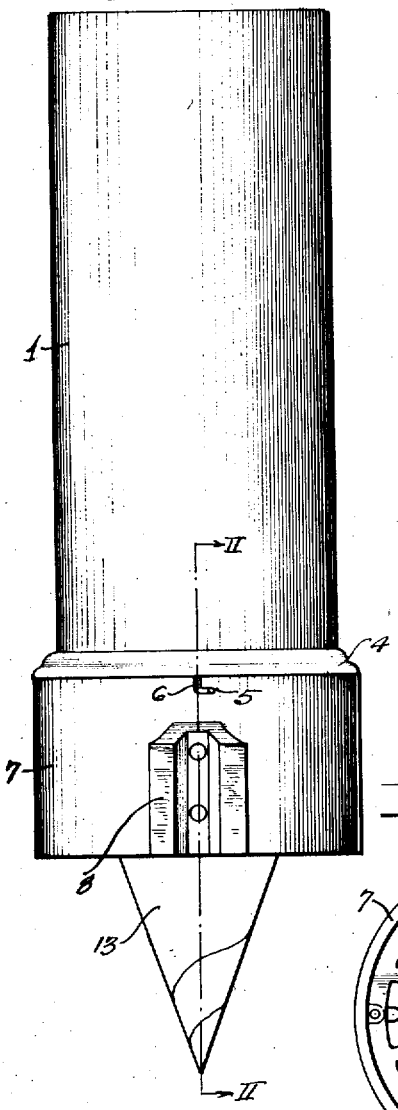
Figure 1 is a back elevation of a cup dispenser embodying the principles of this invention.
Figure 4:
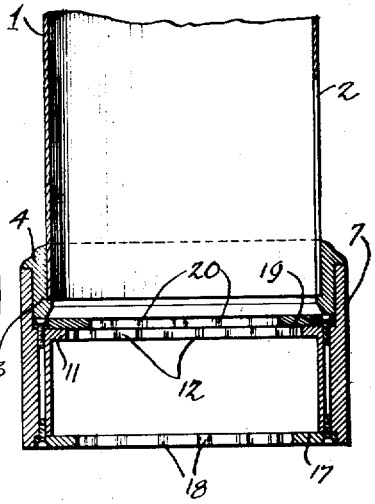
Figure 4 is a fragmentary longitudinal section of the lower portion of the cup dispenser equipped with removable retaining rings to permit conical cups of a smaller size to be dispensed from the container.
Figure 5:
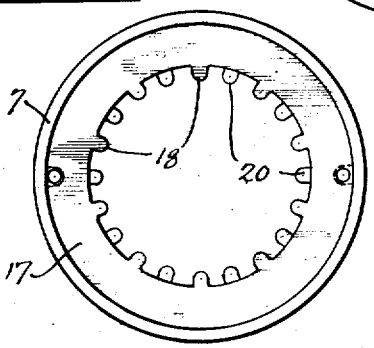
Figure 5 is a bottom plan view of the dispenser illustrated in Figure 4 showing a bottom retaining ring having its internal diameter smaller than the ring illustrated in Figure 3 to permit smaller cups to be dispensed from the same container.

When it is desired to dispense conical cups of a size which are smaller than the stack of cups 13 the lower retaining ring 14 is removed and another retaining ring 17 is removably secured in the recessed bottom end of the supporting ring 7. The retaining ring 17 has a central opening of less diameter than the ring 14, and is provided with a plurality of circumferentially positioned rounded projections or fingers 18, as illustrated in Figure 5. Removably positioned upon the inner or primary retaining ring 11 is an auxiliary retaining ring 19 the inner diameter of which is equal to the inner diameter of the bottom retaining ring 17. The inner peripheral margin of the auxiliary ring 19 is provided with a plurality of spaced rounded projections or fingers 20 which are staggered with respect to the fingers 18 on the bottom ring 17. With the auxiliary rings 19 and 17 in position, as illustrated in Figure 4, a stack of conical cups of a smaller size may be positioned within the dispenser container 1 for removal therefrom one at a time as hereinbefore described in connection with Figures 1 to 3 inclusive. In this case the lower retaining ring 17 acts as a means for insuring the separation of cups in case more than one cup is withdrawn through the primary or inner retainer ring 19.

The improved dispenser base may thus be equipped with cup retaining rings of different sizes depending upon the size of the conical cups which are to be dispensed. It will, of course, be understood that if desired the primary or inner ring 11 may be made removable instead of forming an integral part of the supporting ring 7, as shown in the drawings.

By means of the bayonet slot 6 and the locking pin 5 the container or housing 1 may be readily removed from the upper end of the supporting ring or bracket 7 to permit a stack of conical cups to be positioned within the container after which the container is put back into position and removably locked therein with the lowermost cup projecting downwardly through the base ring 7 and through the retaining rings therein. This arrangement permits access to be had to the closed tapered end of the lowermost cup to permit a person to obtain a hold on the cup so that the cup may be readily withdrawn through the bottom of the dispenser. The double ring arrangement provided within the base ring 7 provides a more positive arrangement for insuring dispensing of cups one at a time. The removable feature of the cup retaining rings affords an arrangement whereby a dispenser may be readily equipped to permit cups of different sizes to be handled by the dispenser.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A cup dispenser comprising a container for a stack of cups, a support for said container, and a plurality of notched flat cup retaining rings removably positioned within said support with the notches in one ring staggered with respect to those in another ring and affording an arrangement through which the cups are adapted to be withdrawn to insure dispensing of the cups one at a time.

2. A cup dispenser comprising a support, a container removably locked thereon and adapted to carry a stack of conical cups with the lowermost cup of said stack projecting through said support, and a plurality of notched retaining rings removably positioned within said support at spaced intervals and with the notches of one ring staggered with respect to those of another ring to afford a means for insuring the dispensing of the cups one at a time from the dispenser.

3. A cup dispenser comprising a container adapted to hold a stack of conical cups, a plurality of flat metal rings removably secured in said container at spaced intervals and a plurality of inwardly directed fingers formed on each of said rings with the fingers of one ring staggered with respect to those of another.

4. A cup dispenser comprising a container adapted to hold a stack of conical cups, a plurality of flat superimposed rings in said container, and rounded fingers integrally formed on the inner peripheries of said rings with the fingers of one ring offset with respect to those of an adjacent ring.

5. A cup dispenser comprising a container, a primary toothed retaining ring mounted therein adapted to normally support a stack of conical cups in position with the lowermost cup projecting from the container, and a secondary toothed retaining ring in said container with the teeth of the secondary retaining ring staggered with respect to the teeth of said primary retaining ring to insure dispensing of the cups one at a time in case more than one cup passes the primary retaining ring.

6. A cup dispenser comprising a container for a stack of internested flexible conical cups, an annular ledge within said container, a dispensing ring removably supported on said ledge and having fingers projecting inwardly to engage with the lowermost cup of the stack a distance below its upper edge whereby to support the stack, said fingers being unyielding whereby when said lowermost cup is pulled downwardly its conical wall will be deflected inwardly into the spaces between said fingers thereby to ease the withdrawal movement of said cup from the stack, and unyielding fingers projecting inwardly from said ledge and forming a dispensing passage for a stack of larger cups when said ring is removed.

7. A cup dispenser comprising a container for a stack of internested flexible conical cups, a zone of fingers a distance above the dispensing end of said container and projecting into the path of the stack and engaging the lowermost cup a distance below its upper edge whereby to support said stack, said fingers being rigid and unyielding whereby when the lowermost cup is pulled downwardly its conical wall will be deflected inwardly by said fingers and will bulge outwardly into the spaces between said fingers thereby to ease the withdrawal movement of said cup past said fingers and separation thereof from said stack, and a second zone of unyielding fingers a distance below said stack supporting zone and in the path of the withdrawn cup for retaining and preventing dispensing with the withdrawn cup of any other cup or cups which may have followed the withdrawn cup through said stack supporting zone.

8. A cup dispenser comprising a container for a stack of internested flexible conical cups, a continuous circumferential row of regularly spaced fingers near the lower or dispensing end of said container projecting radially into the path of said stack and engaging only with the lowermost cup at a distance below its upper edge whereby to support said stack with its lower end projecting a distance below the dispensing end of said container, said fingers being relatively small as well as rigid and unyielding and being rounded horizontally at their inner cup engaging edges whereby when said lowermost cup is pulled downwardly its conical walls adjacent to its edge will be gradually deflected inwardly by said fingers in accordance with the rounded edges thereof and will bulge outwardly only to a slight extent into the spaces between said fingers thereby to ease the withdrawal movement of said cup past said fingers, said fingers after release therefrom of said cup serving to engage with the succeeding cup to prevent it from following the withdrawn cup.

In testimony whereof I have hereunto subscribed my name at New York, county of New York, State of New York.

CESARE BARBIERI.